(12) United States Patent
Kim et al.

(10) Patent No.: US 11,790,290 B1
(45) Date of Patent: *Oct. 17, 2023

(54) SYSTEM AND METHOD FOR OPTIMIZING WASTE / RECYCLING COLLECTION AND DELIVERY ROUTES FOR SERVICE VEHICLES

(71) Applicant: WM INTELLECTUAL PROPERTY HOLDINGS, L.L.C., Houston, TX (US)

(72) Inventors: Seongbae Kim, Houston, TX (US); Hemachandra Pillutla, Houston, TX (US)

(73) Assignee: WM INTELLECTUAL PROPERTY HOLDINGS, L.L.C., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/862,118

(22) Filed: Jul. 11, 2022

Related U.S. Application Data

(63) Continuation of application No. 17/384,356, filed on Jul. 23, 2021, now Pat. No. 11,386,362.

(60) Provisional application No. 63/126,463, filed on Dec. 16, 2020.

(51) Int. Cl.
  *G01C 21/34* (2006.01)
  *G06Q 10/047* (2023.01)
  *G06Q 10/30* (2023.01)

(52) U.S. Cl.
  CPC ....... *G06Q 10/047* (2013.01); *G01C 21/3415* (2013.01); *G06Q 10/30* (2013.01)

(58) Field of Classification Search
  CPC ... G06Q 10/047; G06Q 10/30; G01C 21/3415

USPC .......................................................... 701/411
See application file for complete search history.

(56) References Cited

U.S. PATENT DOCUMENTS

| | | |
|---|---|---|
| 3,202,305 A | 8/1965 | Herpich |
| 5,072,833 A | 12/1991 | Hansen et al. |
| 5,230,393 A | 7/1993 | Mezey |
| 5,245,137 A | 9/1993 | Bowman et al. |
| 5,278,914 A | 1/1994 | Kinoshita et al. |
| 5,489,898 A | 2/1996 | Shigekusa et al. |
| 5,762,461 A | 6/1998 | Frohlingsdorf |
| 5,837,945 A | 11/1998 | Cornwell et al. |
| 6,097,995 A | 8/2000 | Tipton et al. |

(Continued)

FOREIGN PATENT DOCUMENTS

| | | |
|---|---|---|
| CA | 2632738 | 5/2016 |
| CA | 2632689 | 10/2016 |

(Continued)

OTHER PUBLICATIONS

US 9,092,921 B2, 07/2015, Lambert et al. (withdrawn)

(Continued)

*Primary Examiner* — Tuan C To
(74) *Attorney, Agent, or Firm* — Greenberg Traurig LLP

(57) ABSTRACT

A system and method for optimizing waste or recycling routes for one or more service vehicles are disclosed. Service providers can determine optimal sets of routes for a fleet of vehicles to traverse in order to service customers more quickly and efficiently. Unique route shapes can be utilized to minimize route overlapping and route balancing can be utilized to produce routes with more manageable daily workloads.

4 Claims, 10 Drawing Sheets

(56) References Cited

U.S. PATENT DOCUMENTS

| | | |
|---|---|---|
| 6,408,261 B1 | 6/2002 | Durbin |
| 6,448,898 B1 | 9/2002 | Kasik |
| 6,510,376 B2 | 1/2003 | Burnstein et al. |
| 6,563,433 B2 | 5/2003 | Fujiwara |
| 6,729,540 B2 | 5/2004 | Ogawa |
| 6,811,030 B1 | 11/2004 | Compton et al. |
| 7,146,294 B1 | 12/2006 | Waitkus, Jr. |
| 7,330,128 B1 | 2/2008 | Lombardo et al. |
| 7,383,195 B2 | 6/2008 | Mallett et al. |
| 7,406,402 B1 | 7/2008 | Waitkus, Jr. |
| 7,501,951 B2 | 3/2009 | Maruca et al. |
| 7,511,611 B2 | 3/2009 | Sabino et al. |
| 7,536,457 B2 | 5/2009 | Miller |
| 7,659,827 B2 | 2/2010 | Gunderson et al. |
| 7,804,426 B2 | 9/2010 | Etcheson |
| 7,817,021 B2 | 10/2010 | Date et al. |
| 7,870,042 B2 | 1/2011 | Maruca et al. |
| 7,878,392 B2 | 2/2011 | Mayers et al. |
| 7,957,937 B2 | 6/2011 | Waitkus, Jr. |
| 7,994,909 B2 | 8/2011 | Maruca et al. |
| 7,999,688 B2 | 8/2011 | Healey et al. |
| 8,020,767 B2 | 9/2011 | Reeves et al. |
| 8,056,817 B2 | 11/2011 | Flood |
| 8,146,798 B2 | 4/2012 | Flood et al. |
| 8,185,277 B2 | 5/2012 | Flood et al. |
| 8,269,617 B2 | 9/2012 | Cook et al. |
| 8,314,708 B2 | 11/2012 | Gunderson et al. |
| 8,330,059 B2 | 12/2012 | Curotto |
| 8,332,247 B1 | 12/2012 | Bailey et al. |
| 8,373,567 B2 | 2/2013 | Denson |
| 8,374,746 B2 | 2/2013 | Plante |
| 8,384,540 B2 | 2/2013 | Reyes et al. |
| 8,417,632 B2 | 4/2013 | Robohm et al. |
| 8,433,617 B2 | 4/2013 | Goad et al. |
| 8,485,301 B2 | 7/2013 | Grubaugh et al. |
| 8,508,353 B2 | 8/2013 | Cook et al. |
| 8,542,121 B2 | 9/2013 | Maruca et al. |
| 8,550,252 B2 | 10/2013 | Borowski et al. |
| 8,564,426 B2 | 10/2013 | Cook et al. |
| 8,564,446 B2 | 10/2013 | Gunderson et al. |
| 8,602,298 B2 | 12/2013 | Gonen |
| 8,606,492 B1 | 12/2013 | Botnen |
| 8,630,773 B2 | 1/2014 | Lee et al. |
| 8,645,189 B2 | 2/2014 | Lyle |
| 8,674,243 B2 | 3/2014 | Curotto |
| 8,676,428 B2 | 3/2014 | Richardson et al. |
| 8,714,440 B2 | 5/2014 | Flood et al. |
| 8,738,423 B2 | 5/2014 | Lyle |
| 8,744,642 B2 | 6/2014 | Nemat-Nasser et al. |
| 8,803,695 B2 | 8/2014 | Denson |
| 8,818,908 B2 | 8/2014 | Altice et al. |
| 8,849,501 B2 | 9/2014 | Cook et al. |
| 8,854,199 B2 | 10/2014 | Cook et al. |
| 8,862,495 B2 | 10/2014 | Ritter |
| 8,880,279 B2 | 11/2014 | Plante |
| 8,930,072 B1 | 1/2015 | Lambert et al. |
| 8,952,819 B2 | 2/2015 | Nemat-Nasser |
| 8,970,703 B1 | 3/2015 | Thomas, II et al. |
| 8,996,234 B1 | 3/2015 | Tamari et al. |
| 9,047,721 B1 | 6/2015 | Botnen |
| 9,058,706 B2 | 6/2015 | Cheng |
| 9,098,884 B2 | 8/2015 | Borowski et al. |
| 9,098,956 B2 | 8/2015 | Lambert et al. |
| 9,111,453 B1 | 8/2015 | Alselimi |
| 9,158,962 B1 | 10/2015 | Nemat-Nasser et al. |
| 9,180,887 B2 | 11/2015 | Nemat-Nasser et al. |
| 9,189,899 B2 | 11/2015 | Cook et al. |
| 9,226,004 B1 | 12/2015 | Plante |
| 9,235,750 B1 | 1/2016 | Sutton et al. |
| 9,238,467 B1 | 1/2016 | Hoye et al. |
| 9,240,079 B2 | 1/2016 | Lambert et al. |
| 9,240,080 B2 | 1/2016 | Lambert et al. |
| 9,245,391 B2 | 1/2016 | Cook et al. |
| 9,247,040 B1 | 1/2016 | Sutton |
| 9,251,388 B2 | 2/2016 | Flood |
| 9,268,741 B1 | 2/2016 | Lambert et al. |
| 9,275,090 B2 | 3/2016 | Denson |
| 9,280,857 B2 | 3/2016 | Lambert et al. |
| 9,292,980 B2 | 3/2016 | Cook et al. |
| 9,298,575 B2 | 3/2016 | Tamari et al. |
| 9,317,980 B2 | 4/2016 | Cook et al. |
| 9,330,287 B2 | 5/2016 | Graczyk et al. |
| 9,341,487 B2 | 5/2016 | Bonhomme |
| 9,342,884 B2 | 5/2016 | Mask |
| 9,344,683 B1 | 5/2016 | Nemat-Nasser et al. |
| 9,347,818 B2 | 5/2016 | Curotto |
| 9,358,926 B2 | 6/2016 | Lambert et al. |
| 9,373,257 B2 | 6/2016 | Bonhomme |
| 9,389,147 B1 | 7/2016 | Lambert et al. |
| 9,390,568 B2 | 7/2016 | Nemat-Nasser et al. |
| 9,396,453 B2 | 7/2016 | Hynes et al. |
| 9,401,985 B2 | 7/2016 | Sutton |
| 9,403,278 B1 | 8/2016 | Van Kampen et al. |
| 9,405,992 B2 | 8/2016 | Badholm et al. |
| 9,418,488 B1 | 8/2016 | Lambert |
| 9,428,195 B1 | 8/2016 | Surpi |
| 9,442,194 B2 | 9/2016 | Kurihara et al. |
| 9,463,110 B2 | 10/2016 | Nishtala et al. |
| 9,466,212 B1 | 10/2016 | Stumphauzer, II et al. |
| 9,472,083 B2 | 10/2016 | Nemat-Nasser |
| 9,495,811 B2 | 11/2016 | Herron |
| 9,501,690 B2 | 11/2016 | Nemat-Nasser et al. |
| 9,520,046 B2 | 12/2016 | Call et al. |
| 9,525,967 B2 | 12/2016 | Mamlyuk |
| 9,546,040 B2 | 1/2017 | Flood et al. |
| 9,573,601 B2 | 2/2017 | Hoye et al. |
| 9,574,892 B2 | 2/2017 | Rodoni |
| 9,586,756 B2 | 3/2017 | O'Riordan et al. |
| 9,589,393 B2 | 3/2017 | Botnen |
| 9,594,725 B1 | 3/2017 | Cook et al. |
| 9,595,191 B1 | 3/2017 | Surpi |
| 9,597,997 B2 | 3/2017 | Mitsuta et al. |
| 9,604,648 B2 | 3/2017 | Tamari et al. |
| 9,633,318 B2 | 4/2017 | Plante |
| 9,633,576 B2 | 4/2017 | Reed |
| 9,639,535 B1 | 5/2017 | Ripley |
| 9,646,651 B1 | 5/2017 | Richardson |
| 9,650,051 B2 | 5/2017 | Hoye et al. |
| 9,679,210 B2 | 6/2017 | Sutton et al. |
| 9,685,098 B1 | 6/2017 | Kypri |
| 9,688,282 B2 | 6/2017 | Cook et al. |
| 9,702,113 B2 | 7/2017 | Kotaki et al. |
| 9,707,595 B2 | 7/2017 | Ripley |
| 9,721,342 B2 | 8/2017 | Mask |
| 9,734,717 B1 | 8/2017 | Surpi et al. |
| 9,754,382 B1 | 9/2017 | Rodoni |
| 9,766,086 B1 | 9/2017 | Rodoni |
| 9,778,058 B2 | 10/2017 | Rodoni |
| 9,803,994 B1 | 10/2017 | Rodoni |
| 9,824,336 B2 | 11/2017 | Borges et al. |
| 9,824,337 B1 | 11/2017 | Rodoni |
| 9,834,375 B2 | 12/2017 | Jenkins et al. |
| 9,852,405 B1 | 12/2017 | Rodoni et al. |
| 10,029,685 B1 | 7/2018 | Hubbard et al. |
| 10,152,737 B2 | 12/2018 | Lyman |
| 10,198,718 B2 | 2/2019 | Rodoni |
| 10,204,324 B2 | 2/2019 | Rodoni |
| 10,210,623 B2 | 2/2019 | Rodoni |
| 10,255,577 B1 | 4/2019 | Steves et al. |
| 10,311,501 B1 * | 6/2019 | Rodoni .............. G06Q 30/0639 |
| 10,332,197 B2 | 6/2019 | Kekalainen et al. |
| 10,354,232 B2 | 7/2019 | Tomlin, Jr. et al. |
| 10,382,915 B2 | 8/2019 | Rodoni |
| 10,410,183 B2 * | 9/2019 | Bostick .............. G06Q 30/0201 |
| 10,594,991 B1 | 3/2020 | Skolnick |
| 10,625,934 B2 | 4/2020 | Mallady |
| 10,628,805 B2 | 4/2020 | Rodatos |
| 10,750,134 B1 | 8/2020 | Skolnick |
| 10,855,958 B1 | 12/2020 | Skolnick |
| 10,911,726 B1 | 2/2021 | Skolnick |
| 11,074,557 B2 | 7/2021 | Flood |
| 11,128,841 B1 | 9/2021 | Skolnick |
| 11,140,367 B1 | 10/2021 | Skolnick |
| 11,172,171 B1 | 11/2021 | Skolnick |

(56) References Cited

U.S. PATENT DOCUMENTS

| | | |
|---|---|---|
| 11,222,491 B2 | 1/2022 | Romano et al. |
| 11,373,536 B1 | 6/2022 | Savchenko |
| 11,386,362 B1 * | 7/2022 | Kim .................... G06Q 10/047 |
| 11,425,340 B1 | 8/2022 | Skolnick |
| 11,475,416 B1 | 10/2022 | Patel et al. |
| 11,475,417 B1 | 10/2022 | Patel et al. |
| 11,488,118 B1 | 11/2022 | Patel et al. |
| 11,616,933 B1 | 3/2023 | Skolnick |
| 11,673,740 B2 | 6/2023 | Leon |
| 11,727,337 B1 | 8/2023 | Savchenko |
| 2002/0069097 A1 | 6/2002 | Conrath |
| 2002/0077875 A1 | 6/2002 | Nadir |
| 2002/0125315 A1 | 9/2002 | Ogawa |
| 2002/0194144 A1 | 12/2002 | Berry |
| 2003/0014334 A1 | 1/2003 | Tsukamoto |
| 2003/0031543 A1 | 2/2003 | Elbrink |
| 2003/0069745 A1 | 4/2003 | Zenko |
| 2003/0191658 A1 | 10/2003 | Rajewski |
| 2003/0233261 A1 | 12/2003 | Kawahara et al. |
| 2004/0039595 A1 | 2/2004 | Berry |
| 2004/0167799 A1 | 8/2004 | Berry |
| 2005/0038572 A1 | 2/2005 | Krupowicz |
| 2005/0080520 A1 | 4/2005 | Kline et al. |
| 2005/0182643 A1 | 8/2005 | Shirvanian |
| 2005/0209825 A1 | 9/2005 | Ogawa |
| 2005/0234911 A1 | 10/2005 | Hess et al. |
| 2005/0261917 A1 | 11/2005 | Forget Shield |
| 2006/0235808 A1 | 10/2006 | Berry |
| 2007/0150138 A1 | 6/2007 | Plante |
| 2007/0260466 A1 | 11/2007 | Casella et al. |
| 2007/0278140 A1 | 12/2007 | Mallett et al. |
| 2008/0010197 A1 | 1/2008 | Scherer |
| 2008/0065324 A1 | 3/2008 | Muramatsu et al. |
| 2008/0077541 A1 | 3/2008 | Scherer et al. |
| 2008/0202357 A1 | 8/2008 | Flood |
| 2008/0234889 A1 | 9/2008 | Sorensen |
| 2009/0014363 A1 | 1/2009 | Gonen et al. |
| 2009/0024479 A1 | 1/2009 | Gonen et al. |
| 2009/0055239 A1 | 2/2009 | Waitkus, Jr. |
| 2009/0083090 A1 | 3/2009 | Rolfes et al. |
| 2009/0126473 A1 | 5/2009 | Porat et al. |
| 2009/0138358 A1 | 5/2009 | Gonen et al. |
| 2009/0157255 A1 | 6/2009 | Plante |
| 2009/0161907 A1 | 6/2009 | Healey et al. |
| 2010/0017276 A1 | 1/2010 | Wolff et al. |
| 2010/0071572 A1 | 3/2010 | Carroll et al. |
| 2010/0119341 A1 | 5/2010 | Flood et al. |
| 2010/0175556 A1 | 7/2010 | Kummer et al. |
| 2010/0185506 A1 | 7/2010 | Wolff et al. |
| 2010/0217715 A1 | 8/2010 | Lipcon |
| 2010/0312601 A1 | 12/2010 | Lin |
| 2011/0108620 A1 | 5/2011 | Wadden et al. |
| 2011/0137776 A1 | 6/2011 | Goad et al. |
| 2011/0208429 A1 | 8/2011 | Zheng et al. |
| 2011/0225098 A1 | 9/2011 | Wolff et al. |
| 2011/0260878 A1 | 10/2011 | Rigling |
| 2011/0279245 A1 | 11/2011 | Hynes et al. |
| 2011/0316689 A1 | 12/2011 | Reyes et al. |
| 2012/0029980 A1 | 2/2012 | Paz et al. |
| 2012/0029985 A1 | 2/2012 | Wilson et al. |
| 2012/0047080 A1 | 2/2012 | Rodatos |
| 2012/0262568 A1 | 10/2012 | Ruthenberg |
| 2012/0265589 A1 | 10/2012 | Whittier |
| 2012/0310691 A1 | 12/2012 | Carlsson et al. |
| 2013/0024335 A1 | 1/2013 | Lok |
| 2013/0039728 A1 | 2/2013 | Price et al. |
| 2013/0041832 A1 | 2/2013 | Rodatos |
| 2013/0075468 A1 | 3/2013 | Wadden et al. |
| 2013/0332247 A1 | 12/2013 | Gu |
| 2014/0060939 A1 | 3/2014 | Eppert |
| 2014/0112673 A1 | 4/2014 | Sayama |
| 2014/0114868 A1 | 4/2014 | Wan et al. |
| 2014/0172174 A1 | 6/2014 | Poss et al. |
| 2014/0214697 A1 | 7/2014 | McSweeney |
| 2014/0236446 A1 | 8/2014 | Spence |
| 2014/0278630 A1 | 9/2014 | Gates et al. |
| 2014/0379588 A1 | 12/2014 | Gates et al. |
| 2015/0095103 A1 | 4/2015 | Rajamani et al. |
| 2015/0100428 A1 | 4/2015 | Parkinson, Jr. |
| 2015/0144012 A1 | 5/2015 | Frybarger |
| 2015/0278759 A1 | 10/2015 | Harris et al. |
| 2015/0294431 A1 | 10/2015 | Fiorucci et al. |
| 2015/0298903 A1 | 10/2015 | Luxford |
| 2015/0302364 A1 | 10/2015 | Calzada et al. |
| 2015/0307273 A1 | 10/2015 | Lyman |
| 2015/0324760 A1 | 11/2015 | Borowski et al. |
| 2015/0326829 A1 | 11/2015 | Kurihara et al. |
| 2015/0348252 A1 | 12/2015 | Mask |
| 2015/0350610 A1 | 12/2015 | Loh |
| 2016/0021287 A1 | 1/2016 | Loh |
| 2016/0044285 A1 | 2/2016 | Gasca et al. |
| 2016/0179065 A1 | 6/2016 | Shahabdeen |
| 2016/0187188 A1 | 6/2016 | Curotto |
| 2016/0224846 A1 | 8/2016 | Cardno |
| 2016/0232498 A1 | 8/2016 | Tomlin, Jr. et al. |
| 2016/0239689 A1 | 8/2016 | Flood |
| 2016/0247058 A1 | 8/2016 | Kreiner et al. |
| 2016/0292653 A1 | 10/2016 | Gonen |
| 2016/0300297 A1 * | 10/2016 | Kekalainen ........... B65F 1/1484 |
| 2016/0321619 A1 | 11/2016 | Inan et al. |
| 2016/0334236 A1 | 11/2016 | Mason et al. |
| 2016/0335814 A1 | 11/2016 | Tamari et al. |
| 2016/0372225 A1 | 12/2016 | Lefkowitz et al. |
| 2016/0377445 A1 | 12/2016 | Rodoni |
| 2016/0379152 A1 | 12/2016 | Rodoni |
| 2016/0379154 A1 | 12/2016 | Rodoni |
| 2017/0008671 A1 | 1/2017 | Whitman et al. |
| 2017/0011363 A1 | 1/2017 | Whitman et al. |
| 2017/0029209 A1 | 2/2017 | Smith et al. |
| 2017/0046528 A1 | 2/2017 | Lambert |
| 2017/0061222 A1 | 3/2017 | Hoye et al. |
| 2017/0076249 A1 | 3/2017 | Byron et al. |
| 2017/0081120 A1 | 3/2017 | Liu et al. |
| 2017/0086230 A1 | 3/2017 | Azevedo et al. |
| 2017/0109704 A1 * | 4/2017 | Lettieri ............. G06Q 10/1093 |
| 2017/0116583 A1 | 4/2017 | Rodoni |
| 2017/0116668 A1 | 4/2017 | Rodoni |
| 2017/0118609 A1 | 4/2017 | Rodoni |
| 2017/0121107 A1 | 5/2017 | Flood et al. |
| 2017/0124533 A1 | 5/2017 | Rodoni |
| 2017/0154287 A1 | 6/2017 | Kalinowski et al. |
| 2017/0176986 A1 | 6/2017 | High et al. |
| 2017/0193798 A1 | 7/2017 | Call et al. |
| 2017/0200333 A1 | 7/2017 | Plante |
| 2017/0203706 A1 | 7/2017 | Reed |
| 2017/0221017 A1 | 8/2017 | Gonen |
| 2017/0243269 A1 | 8/2017 | Rodini et al. |
| 2017/0243363 A1 | 8/2017 | Rodini |
| 2017/0277726 A1 | 9/2017 | Huang et al. |
| 2017/0308871 A1 | 10/2017 | Tallis |
| 2017/0330134 A1 | 11/2017 | Botea et al. |
| 2017/0344959 A1 | 11/2017 | Bostick et al. |
| 2017/0345169 A1 | 11/2017 | Rodoni |
| 2017/0350716 A1 | 12/2017 | Rodoni |
| 2017/0355522 A1 | 12/2017 | Salinas et al. |
| 2017/0364872 A1 | 12/2017 | Rodoni |
| 2018/0012172 A1 | 1/2018 | Rodoni |
| 2018/0025329 A1 * | 1/2018 | Podgorny ............... G06Q 30/04 705/7.15 |
| 2018/0075417 A1 | 3/2018 | Gordon et al. |
| 2018/0158033 A1 * | 6/2018 | Woods ............ G06Q 10/06314 |
| 2018/0194305 A1 | 7/2018 | Reed |
| 2018/0224287 A1 * | 8/2018 | Rodini ...................... G01S 5/02 |
| 2018/0245940 A1 | 8/2018 | Dong et al. |
| 2018/0247351 A1 | 8/2018 | Rodoni |
| 2019/0005466 A1 | 1/2019 | Rodoni |
| 2019/0019167 A1 | 1/2019 | Candel et al. |
| 2019/0050879 A1 | 2/2019 | Zhang et al. |
| 2019/0056416 A1 | 2/2019 | Rodoni |
| 2019/0065901 A1 | 2/2019 | Amato et al. |
| 2019/0121368 A1 | 4/2019 | Bussetti et al. |
| 2019/0196965 A1 * | 6/2019 | Zhang ................ G06F 12/0253 |
| 2019/0197498 A1 | 6/2019 | Gates et al. |
| 2019/0210798 A1 * | 7/2019 | Schultz ................. B65F 1/1484 |

(56) References Cited

U.S. PATENT DOCUMENTS

| | | | |
|---|---|---|---|
| 2019/0217342 A1 | 7/2019 | Parr et al. | |
| 2019/0244267 A1 | 8/2019 | Rattner et al. | |
| 2019/0311333 A1 | 10/2019 | Kekalainen et al. | |
| 2019/0360822 A1* | 11/2019 | Rodoni | G01S 5/0295 |
| 2019/0385384 A1 | 12/2019 | Romano et al. | |
| 2020/0082167 A1 | 3/2020 | Shalom et al. | |
| 2020/0082354 A1 | 3/2020 | Kurani | |
| 2020/0109963 A1 | 4/2020 | Zass | |
| 2020/0175556 A1 | 6/2020 | Podgorny | |
| 2020/0189844 A1 | 6/2020 | Sridhar | |
| 2020/0191580 A1 | 6/2020 | Christensen et al. | |
| 2020/0401995 A1 | 12/2020 | Aggarwala et al. | |
| 2021/0024068 A1 | 1/2021 | Lacaze et al. | |
| 2021/0060786 A1 | 3/2021 | Ha | |
| 2021/0188541 A1 | 6/2021 | Kurani et al. | |
| 2021/0217156 A1 | 7/2021 | Balachandran et al. | |
| 2021/0345062 A1 | 11/2021 | Koga et al. | |
| 2021/0371196 A1 | 12/2021 | Krishnamurthy et al. | |
| 2022/0118854 A1 | 4/2022 | Davis et al. | |
| 2023/0117427 A1 | 4/2023 | Turner et al. | |

FOREIGN PATENT DOCUMENTS

| | | | |
|---|---|---|---|
| CN | 101482742 | 7/2009 | |
| CN | 101512720 | 8/2009 | |
| CN | 105787850 | 7/2016 | |
| CN | 105929778 | 9/2016 | |
| CN | 106296416 | 1/2017 | |
| DE | 69305435 | 4/1997 | |
| DE | 69902531 | 4/2003 | |
| DE | 102012006536 | 10/2013 | |
| EP | 577540 | 10/1996 | |
| EP | 1084069 | 8/2002 | |
| EP | 2028138 | 2/2009 | |
| GB | 2447184 | 9/2008 | |
| GB | 2508209 A * | 5/2014 | B65F 1/00 |
| JP | 3662616 | 6/2005 | |
| JP | 2012-206817 | 10/2012 | |
| JP | 2013-142037 | 7/2013 | |
| WO | 99/54237 | 10/1999 | |
| WO | 2007/067772 | 6/2007 | |
| WO | 2007/067775 | 6/2007 | |
| WO | 2012/069839 | 5/2012 | |
| WO | 2012/172395 | 12/2012 | |
| WO | 2016/074608 | 5/2016 | |
| WO | 2016/187677 | 12/2016 | |
| WO | 2017/070228 | 4/2017 | |
| WO | 2017/179038 | 10/2017 | |
| WO | 2018/182858 | 10/2018 | |
| WO | 2018/206766 | 11/2018 | |
| WO | 2018/215682 | 11/2018 | |

OTHER PUBLICATIONS

Zainab et al., "An Optimization Approach for Waste Collection Routes Based on GIS in Hillah-Iraq," 2018, Publisher: IEEE.*
Sangita et al., "Solid Waste Collection as a Service using IoT-Solution for Smart Cities," 2018, Publisher: IEEE.*
Ali, Tariq et al.; IoT-Based Smart Waste Bin Monitoring and Municipal Solid Waste Manaement System for Smart Cities; Arabian Journal for Science and Engineering; Jun. 4, 2020; 14 pages.
Alfeo, Antonio Luca et al.; Urban Swarms: A new approch for autonomous waste management; Mar. 1, 2019; 8 pages.
Nilopherjan, N. et al.; Automatic Garbage Volume Estimation Using SIFT Features Through Deep Neural Networks and Poisson Surface Reconstruction; International Journal of Pure and Applied Mathematics; vol. 119, No. 14; 2015; pp. 1101-1107.
Ghongane, Aishwarya et al; Automatic Garbage Tracking and Collection System; International Journal of Advanced Technology in Engineering and Science; vol. 5, No. 4; Apr. 2017; pp. 166-173.
Waste Management Review; A clear vison on waste collections; Dec. 8, 2015; 5 pages; http://wastemanagementreiew.com/au/a-clear-vison-on-waste-collections/.
Waste Management Surveillance Solutiosn; Vehicle Video Cameral; Aug. 23, 2017; 6 pages; http://vehiclevideocameras.com/mobile-video-applications/waste-management-camera.html.
Rich, John I.; Truck Equipment: Creating a Safer Waste Truck Environment; Sep. 2013; pp. 18-20; WasteAdvantage Magainze.
Town of Prosper; News Release: Solid Waste Collection Trucks Equipped wit "Third Eye," video system aborad trash and recycling trucks to improve service; Jan. 13, 2017; 1 page; U.S.
Product News Network; Telematics/Live Video System Increases Driver Safety/Productivity; Mar. 30, 2015; 3 pages; Thomas Industrial Network, Inc.
Karidis, Arlene; Waste Pro to Install Hight-Tech Camera Systems in all Trucks to Address Driver Safety; Mar. 10, 2016; 2 pages; Wastedive.com.
Greenwalt, Megan; Finnish Company Uses IoT to Digitize Trash Bins; Sep. 14, 2016; 21 pages; www.waste360.com.
Georgakopoulos, Chris; Cameras Cut Recycling Contamination; The Daily Telegraph; Apr. 7, 2014; 2 pages.
Van Dongen, Matthew; Garbage 'Gotcha' Videos on Rise in City: Residents Irked Over Perceived Infractions; Nov. 18, 2015; 3 pages; The Spectator.
The Advertiser; Waste Service Drives Innovation; Jan. 25, 2016; 2 pages; Fairfax Media Publications Pty Limited; Australia.
rwp-wasteportal.com; Waste & Recycling Data Portal and Software; 16 pages; printed Oct. 3, 2019.
Bhargava, Hermant K. et al.; A Web-Based Decision Support System for Waste Disposal and Recycling; pp. 47-65; 1997; Comput. Environ. And Urban Systems, vol. 21, No. 1; Pergamon.
Kontokasta, Constantine E. et al.; Using Machine Learning and Small Area Estimation to Predict Building-Level Municipal Solid Waste Generation in Cities; pp. 151-162; 2018; Computer, Envieonment and Urban Systems; Elsevier.
Ferrer, Javier et al.; BIN-CT: Urban Waste Collection Based on Predicting the Container Fill Level; Apr. 23, 2019; 11 pages; Elsevier.
Vu, Hoang Lan et al.; Waste Management: Assessment of Waste Characteristics and Their Impact on GIS Vechicle Collection Route Optimization Using ANN Waste Forecasts; Environmental Systems Engineering; Mar. 22, 2019; 13 pages; Elsevier.
Hina, Syeda Mahlaqa; Municipal Solid Waste Collection Route Optimization Using Geospatial Techniques: A Case Study of Two Metropolitan Cities of Pakistan; Feb. 2016; 205 pages; U.S.
Kannangara, Miyuru et al.; Waste Management: Modeling and Prediction of Regional Municipal Soid Waste Generation and Diversion in Canada Using Machine Learning Approaches; Nov. 30, 2017; 3 pages; Elsevier.
Oliveira, Veronica et al.; Journal of Cleaner Production: Artificial Neural Network Modelling of the Amount of Separately-Collected Household Packaging Waste; Nov. 8, 2018; 9 pages; Elsevier.
Zade, Jalili Ghazi et al.; Prediction of Municipal Solid Waste Generation by Use of Artificial Neural Network: A Case Study of Mashhad; Winter 2008; 10 pages; Int. J. Environ. Res., 2(1).
Sein, Myint Myint et al.; Trip Planning Query Based on Partial Sequenced Route Algorithm; 2019 IEEE 8th Global Conference; pp. 778-779.
A.F., Thompson et al.; Application of Geographic Information System to Solid Waste Management; Pan African International Conference on Information Science, Computing and Telecommunications; 2013; pp. 206-211.
Malakahmad, Amirhossein et al.; Solid Waste Collection System in Ipoh City, A Review; 2011 International Conference on Business, Engineering and Industrial Applications; pp. 174-179.
Rajani et al.; Waste Management System Based on Location Intelligence; 4 pages; Poojya Doddappa Appa College of Engineering, Kalaburgi; Nov. 16, 2018; 4 pages.
Tan, Kah Chun et al.; Smart Land: AI Waste Sorting System; University of Malaya; 2019; 2 pages; Keysight Technologies.

* cited by examiner

SYSTEM AND METHOD FOR OPTIMIZING WASTE / RECYCLING COLLECTION AND DELIVERY ROUTES FOR SERVICE VEHICLES

RELATED APPLICATIONS

This application is a continuation application and claims the benefit, and priority benefit, of U.S. patent application Ser. No. 17/384,356, filed Jul. 23, 2021, which claims the benefit, and priority benefit, of U.S. Provisional Patent Application Ser. No. 63/126,463, filed Dec. 16, 2020, the disclosure and contents of which are incorporated by reference herein in their entirety.

BACKGROUND

1. Field of Invention

The presently disclosed subject matter relates generally to route optimization, and more specifically, to optimization of collection/delivery routes for waste/recycling service vehicles.

2. Description of the Related Art

Traditional system and method of waste/recycling operations involve collecting and transporting waste to disposal stations and delivery of containers to customers by trucks along settled routes. These settled routes may present logistical and other challenges for service providers. Improvements in this field are therefore desired.

SUMMARY

In accordance with the presently disclosed subject matter, various illustrative embodiments of a system and method for optimizing waste or recycling routes for one or more service vehicles are described herein.

In certain illustrative embodiments, a method of optimizing delivery of waste or recycling services to customers using a waste or recycling service vehicle is disclosed. A sequence is developed of two or more census tracts using United States census tract data. A travel route is developed for the waste or recycling service vehicle using the sequence of two or more census tracts. Waste or recycling services are delivered to customers along the travel route with the waste or recycling service vehicle. In certain aspects, the developing of the sequence of two or more census tracts can include determining a representing stop for each census tract, wherein the representing stop comprises a customer location that is at or near the centroid of the census tract, and sequencing the census tracts using the representing stops of each census tract to determine an optimal tract sequence list. In certain aspects, the developing the travel route for the waste or recycling service vehicle can include: (i) adding all unrouted stops from each census tract into the travel route, starting from the first census tract of the optimal tract sequence list, until the travel route has met a defined primary fullness criteria; (ii) adding all unrouted stops from each census block group into the travel route, starting from the first block group of the census tract in (i) that is closest to the census tract that fulfills the primary fullness criteria, until the travel route has met a defined secondary fullness criteria; (iii) adding all unrouted stops from each census block into the travel route, starting from the first block of the census block group in (ii) that is closest to the census block group that fulfills the primary fullness criteria, until the travel route has met a defined tertiary fullness criteria; (iv) determining an optimal sequence for the travel route; and (v) repeating steps (i)-(iv) until all desired stops in each census tract are routed. The primary fullness criteria can include one or more of a daily volume capacity or a daily maximum time met for the travel route. The secondary fullness criteria can include one or more of a daily volume capacity or a daily maximum time met for the travel route. The secondary fullness criteria can vary depending on the type of waste or recycling service vehicle. The tertiary fullness criteria can include one or more of a daily volume capacity or a daily maximum time met for the travel route. The tertiary fullness criteria can vary depending on the type of waste or recycling service vehicle. The primary fullness criteria can further include real time route conditions, including but not limited to traffic conditions on the road, and the position of the vehicle on the road through a GPS device can be applied to perform a real time reroute. The primary fullness criteria can further include one or more of the number of customers already served, and the current customer being served relative to the remaining time available to complete the route can be applied to perform a real time reroute. The secondary fullness criteria further can include real time route conditions, including but not limited to traffic conditions on the road, and the position of the vehicle on the road through a GPS device can be applied to perform a real time reroute. The secondary fullness criteria can further include one or more of the number of customers already served, and the current customer being served relative to the remaining time available to complete the route can be applied to perform a real time reroute. The tertiary fullness further includes comprises real time route conditions, including but not limited to traffic conditions on the road, and the position of the vehicle on the road through a GPS device can be applied to perform a real time reroute. The tertiary fullness criteria further include one or more of the number of customers already served, and the current customer being served relative to the remaining time available to complete the route can be applied to perform a real time reroute.

In certain illustrative embodiments, a system for optimizing delivery of waste or recycling services to customers is disclosed. The system can include a waste or recycling service vehicle, a memory storage area, and a processor in communication with the memory storage area and configured to develop a sequence of two or more census tracts using United States census tract data, and develop a travel route for the waste or recycling service vehicle using the sequence of two or more census tracts. The processor can be further configured to determine a representing stop for each census tract, wherein the representing stop comprises a customer location that is at or near the centroid of the census tract, and sequence the census tracts using the representing stops of each census tract to determine an optimal tract sequence list. The processor can be further configured to: (i) add all unrouted stops from each census tract into the travel route, starting from the first census tract of the optimal tract sequence list, until the travel route has met a defined primary fullness criteria; (ii) add all unrouted stops from each census block group into the travel route, starting from the first block group of the census tract in (i) that is closest to the census tract that fulfills the primary fullness criteria, until the travel route has met a defined secondary fullness criteria; (iii) add all unrouted stops from each census block into the travel route, starting from the first block of the census block group in (ii) that is closest to the census block group that fulfills the primary fullness criteria, until the travel route has met a defined tertiary fullness criteria; (iv) determine an optimal sequence for the travel route; and (v) repeat steps (i)-(iv) until all desired stops in each census tract are routed.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

DETAILED DESCRIPTION

Various illustrative embodiments of a system and method for optimizing waste or recycling routes for one or more service vehicles are described herein.

Traditional vehicle routing approaches have sought to minimize the number of vehicle routes and total route time and cost for a waste/recycling services provider during performance of a service activity, but these approaches have proven to be ineffective.

In certain illustrative embodiments, the presently disclosed system and method can utilize unique route shapes to minimize route overlapping, as well as utilize route balancing to produce routes with more manageable daily workloads. The presently disclosed system and method enable providers to determine optimal sets of routes for a fleet of vehicles to traverse in order to service customers more quickly and efficiently.

In certain illustrative embodiments, the presently disclosed system and method can utilize predefined geographic areas such as government census regions as a guiding tool for vehicle routing. Vehicle routing algorithms can be developed using nested levels of census geographies such as census block identifications. For example, the algorithms can run up and down to nested levels, e.g., from census tract, to census block groups, and to census blocks, which allows a service provider to incorporate more stops into routes while preserving route boundaries. In certain illustrative embodiments, the presently disclosed system and method allow a user to estimate the number of vehicle routes for operational planning purposes, as well as create an optimal route sequence while considering natural boundaries for tactical planning.

Figure 1:
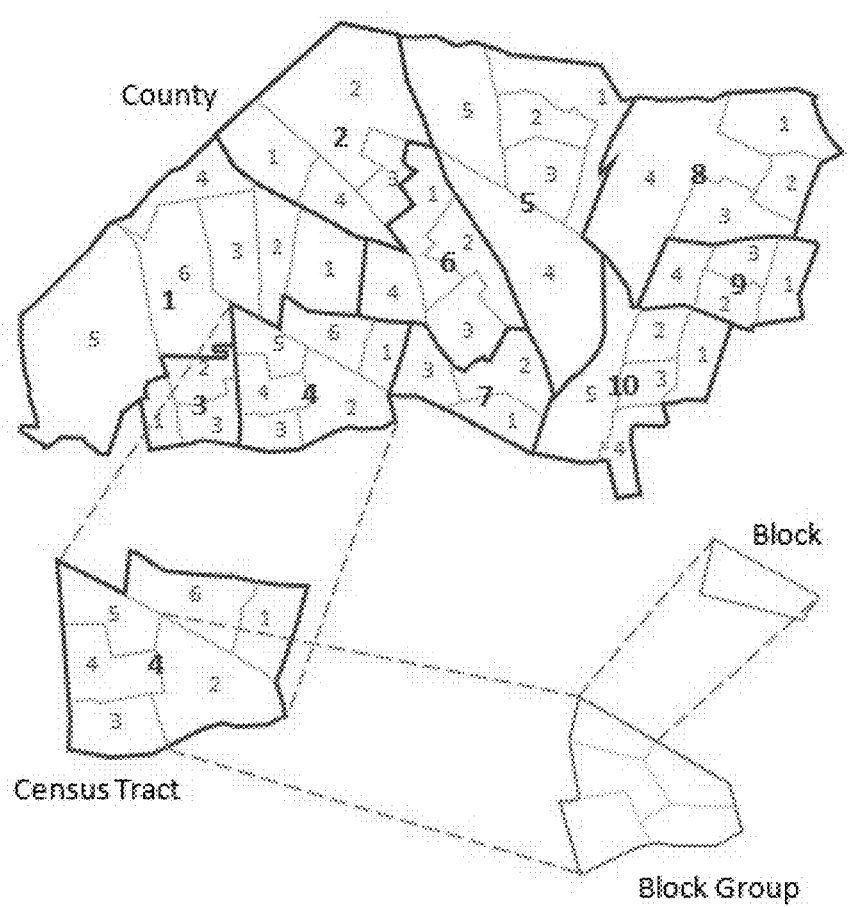
FIG. 1 is a representative map of U.S. census block, block group, and tract regions according to embodiments of the present disclosure.

The United States Census Bureau utilizes a census block as a base geographic unit or region for tabulation of data. Collections of census blocks form a block group, and collections of block groups form a tract. See FIG. 1 herein. Census blocks can be bounded on all sides by visible geographic features, such as streets, roads, streams, and railroad tracks, and can nest within all types of geographic areas. For example, in cities, a census block may correspond to a city block, but in rural areas where there are fewer roads, census blocks may be defined by other features such as political boundaries, rivers and other natural features, parks and similar facilities, etc. Each census block/block group/tract has a unique ID (GEOID). The GEOID for a census block is a 15 digit number. A collection of census blocks under same block group have the same first 12 digits of the census block ID. Likewise, a collection of block groups sharing the same tract have the same first 11 digits of census block group ID.

Figure 2:
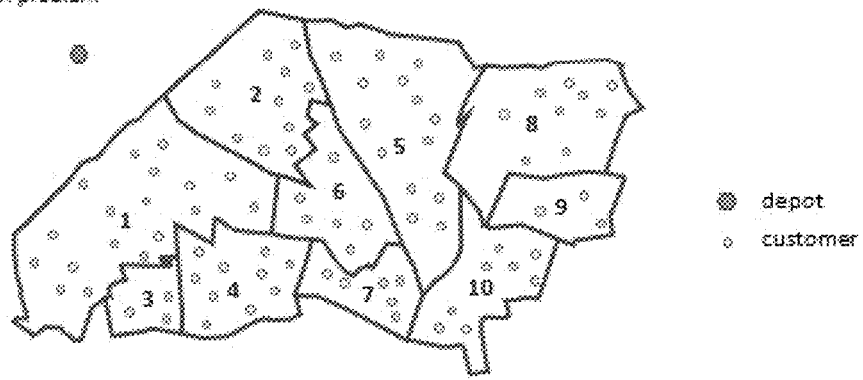
FIG. 2 is a diagram of an illustrative method according to embodiments of the present disclosure.
Figure 2:
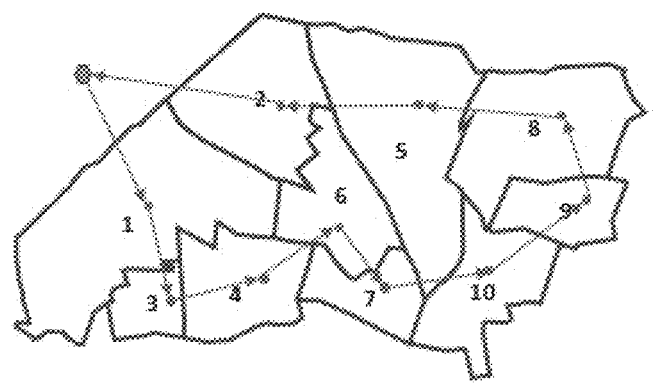
Figure 2:
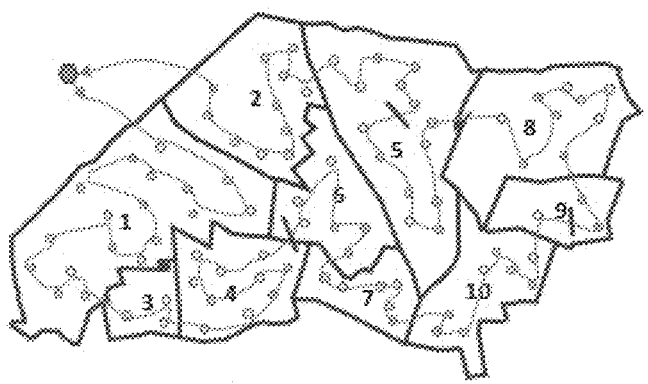

Referring now to FIG. 2, an illustrative embodiment of a method of using geographic entities for vehicle route optimization is provided. In certain illustrative embodiments, the method can include an iterative two-step process.

In Step 1, census tracts are sequenced. In Step 1.1, a customer location is found that is closest from the centroid of each census tract and this customer stop is set as a representing stop of the census tract. In Step 1.2, the census tracts are sequenced using the representing stops of each census tract. The output of Step 1.2 is the optimal tract sequence list ("OTSL").

In Step 2, routes are created using the OTSL. In Step 2.1, all unrouted stops in the census tract are added into the route, starting from the first sequence of the OTSL. In Step 2.2, the route is checked to see if it is full. As used herein, the term "full" can mean either daily volume capacity for the route or daily maximum route time met, although other possible meanings of the term "full" are also contemplated. When the route is full by adding all unrouted stops in the current census tract, it is possible that the final sequenced route time is over maximum route time. In order to increase the level of solution quality both in balance and in compactness, the next step in the process is to go down to nested levels (census block groups and census blocks) of census tract. To do so, if the route is full, first remove recently added stops of the current census tract from the route, and the next set of nested levels can be applied under Step 2.2.0. If the route is not full, Steps 2.1 and 2.2 are repeated with the next sequence of the OTSL. In Step 2.2.0, census block groups of the current census tract can be applied. In Step 2.2.1, all unrouted stops in a census block group can be added into the route, starting from the closest census block group from the previous tract. In Step 2.2.2, the route is checked to see if it is full. If the route is not full, Steps 2.2.1 and 2.2.2 are repeated with the next closest census block group. If the route is full, all stops added in the current census block group are removed, and Steps 2.2.0, 2.2.1, and 2.2.2 are repeated with the census block, which is the next nested lower level of the census block group. Once the route is full and no more block groups can be added, then Step 2.3 can be applied. In Step 2.3, an optimal sequence is determined for a given route, and Step 2 is repeated until all desired stops in the census tracts are routed.

Figure 3:
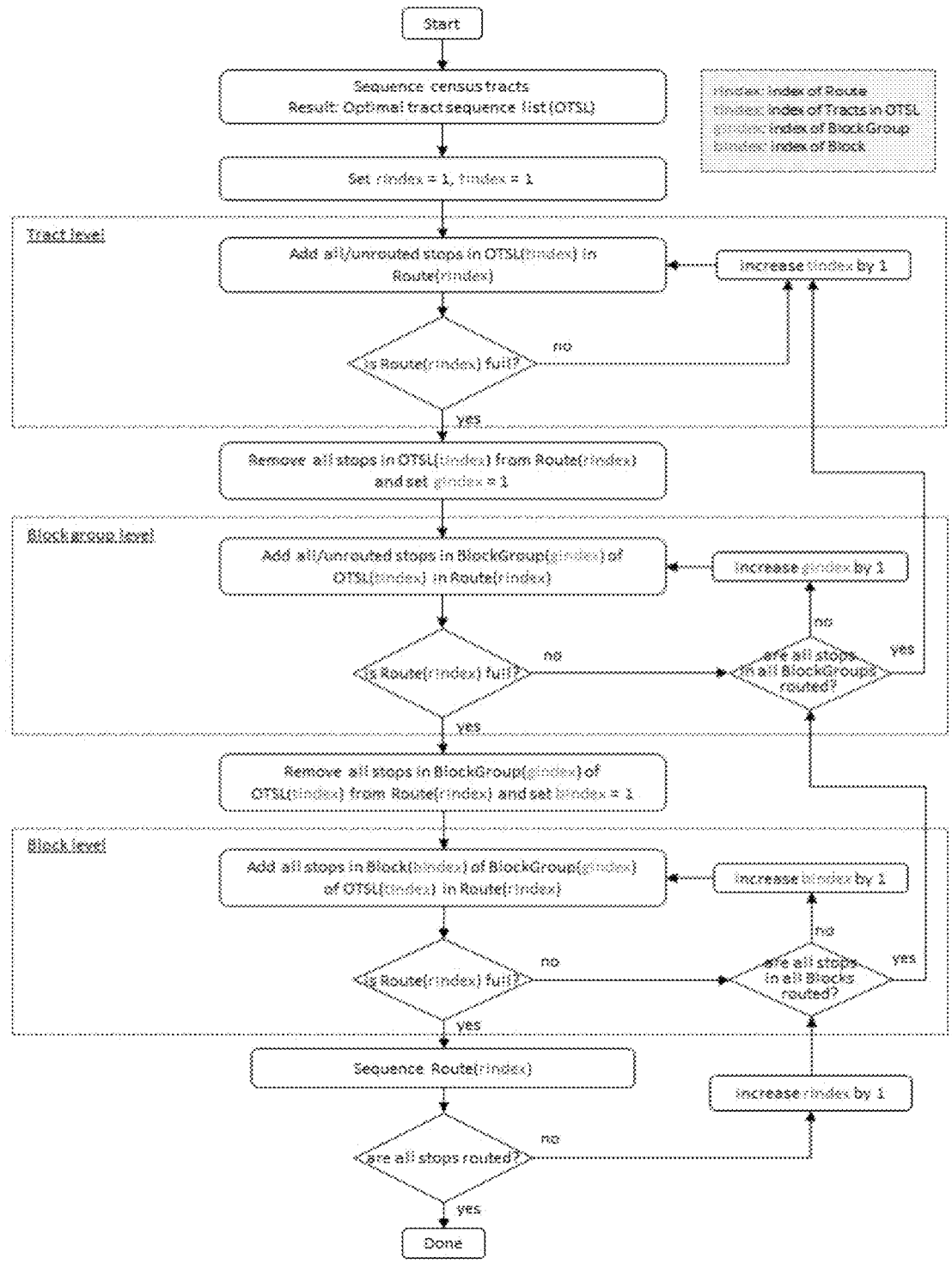
FIG. 3 is a flow diagram of an illustrative method according to embodiments of the present disclosure.

Referring now to FIG. 3, a more detailed flow diagram of the illustrative embodiment of FIG. 2 is provided.

In certain illustrative embodiments, a method of optimizing delivery of waste or recycling services to customers using a waste or recycling service vehicle is disclosed. A sequence is developed of two or more census tracts using United States census tract data. A travel route is developed for the waste or recycling service vehicle using the sequence of two or more census tracts. Waste or recycling services are delivered to customers along the travel route with the waste or recycling service vehicle. In certain aspects, the developing of the sequence of two or more census tracts can include determining a representing stop for each census tract, wherein the representing stop comprises a customer location that is at or near the centroid of the census tract, and sequencing the census tracts using the representing stops of each census tract to determine an optimal tract sequence list. In certain aspects, the developing the travel route for the waste or recycling service vehicle can include: (i) adding all unrouted stops from each census tract into the travel route, starting from the first census tract of the optimal tract sequence list, until the travel route has met a defined primary fullness criteria; (ii) adding all unrouted stops from each census block group into the travel route, starting from the first block group of the census tract in (i) that is closest to the census tract that fulfills the primary fullness criteria, until the travel route has met a defined secondary fullness criteria; (iii) adding all unrouted stops from each census block into the travel route, starting from the first block of the census block group in (ii) that is closest to the census block group that fulfills the primary fullness criteria, until the travel route has met a defined tertiary fullness criteria; (iv) determining an optimal sequence for the travel route; and (v) repeating steps (i)-(iv) until all desired stops in each census tract are routed. The primary fullness criteria can include one or more of a daily volume capacity or a daily maximum time met for the travel route. The secondary fullness criteria can include one or more of a daily volume capacity or a daily maximum time met for the travel route. The secondary fullness criteria can vary depending on the type of waste or recycling service vehicle. The tertiary fullness criteria can include one or more of a daily volume capacity or a daily maximum time met for the travel route. The tertiary fullness criteria can vary depending on the type of waste or recycling service vehicle. The primary fullness criteria can further include real time route conditions, including but not limited to traffic conditions on the road, and the position of the vehicle on the road through a GPS device can be applied to perform a real time reroute. The primary fullness criteria can further include one or more of the number of customers already served, and the current customer being served relative to the remaining time available to complete the route can be applied to perform a real time reroute. The secondary fullness criteria further can include real time route conditions, including but not limited to traffic conditions on the road, and the position of the vehicle on the road through a GPS device can be applied to perform a real time reroute. The secondary fullness criteria can further include one or more of the number of customers already served, and the current customer being served relative to the remaining time available to complete the route can be applied to perform a real time reroute. The tertiary fullness further includes comprises real time route conditions, including but not limited to traffic conditions on the road, and the position of the vehicle on the road through a GPS device can be applied to perform a real time reroute. The tertiary fullness criteria further include one or more of the number of customers already served, and the current customer being served relative to the remaining time available to complete the route can be applied to perform a real time reroute.

In certain illustrative embodiments, a system for optimizing delivery of waste or recycling services to customers is disclosed. The system can include a waste or recycling service vehicle, a memory storage area, and a processor in communication with the memory storage area and configured to develop a sequence of two or more census tracts using United States census tract data, and develop a travel route for the waste or recycling service vehicle using the sequence of two or more census tracts. The processor can be further configured to determine a representing stop for each census tract, wherein the representing stop comprises a customer location that is at or near the centroid of the census tract, and sequence the census tracts using the representing stops of each census tract to determine an optimal tract sequence list. The processor can be further configured to: (i) add all unrouted stops from each census tract into the travel route, starting from the first census tract of the optimal tract sequence list, until the travel route has met a defined primary fullness criteria; (ii) add all unrouted stops from each census block group into the travel route, starting from the first block group of the census tract in (i) that is closest to the census tract that fulfills the primary fullness criteria, until the travel route has met a defined secondary fullness criteria; (iii) add all unrouted stops from each census block into the travel route, starting from the first block of the census block group in (ii) that is closest to the census block group that fulfills the primary fullness criteria, until the travel route has met a defined tertiary fullness criteria; (iv) determine an optimal sequence for the travel route; and (v) repeat steps (i)-(iv) until all desired stops in each census tract are routed.

The presently disclosed system and method have a number of advantages over prior art technologies. Traditionally, vehicle routing has belonged to the NP-hard class of computational complexity theory, meaning it is in a class of problems at least as hard as the hardest problems in NP (non-deterministic polynomial-time). In certain illustrative embodiments, the presently disclosed system and method are effective for developing well-shaped and well-balanced vehicle routes with minimal route overlaps, while also minimizing the number of routes and total route time. Since census block IDs are based on geographic area and incorporate pre-existing geographic boundaries, the use of this data for finding routing algorithms and developing solutions and practical applications for this information is particularly effective. For example, natural geographic barriers such as rivers, mountains, and railroads can work as route boundaries and be avoided in a waste/recycling collection route. Also, customers in nearby census blocks are geographically close and thus can be inserted into the same route.

The presently disclosed system and method produce well-balanced, well-compacted and well-shaped routes, and also show significant route number and total route time savings as compared to existing system and method. The resulting routes are balanced with respect to meeting the planned maximum route time for the routes within an acceptable buffer time. Using the presently disclosed system and method, the number of routes whose route time is over a maximum route time plus allowable buffer is a small percentage and is a significant improvement while showing route savings compared to existing systems and methods.

In certain illustrative embodiments, the presently disclosed system and method can be extended to using other geographic entities besides U.S. government census regions, such as parcels. For example, the presently disclosed system and method can be extended to use parcel geographies maintained for the counties in the US, whereby information and attributes of the parcels can be utilized to create routes.

In addition, the presently disclosed system and method can be extended to using other vehicle routing besides waste/recycling collection vehicles, such as package delivery/pickup vehicles, food delivery services, passenger pickup services, school bus routing, and the like. The vehicle routing solutions provide an accurate estimate of the total route time and are designed to minimize the cost of the route while meeting the other required constraints and providing consistency of service to customers in various types of industries.

Figure 4:
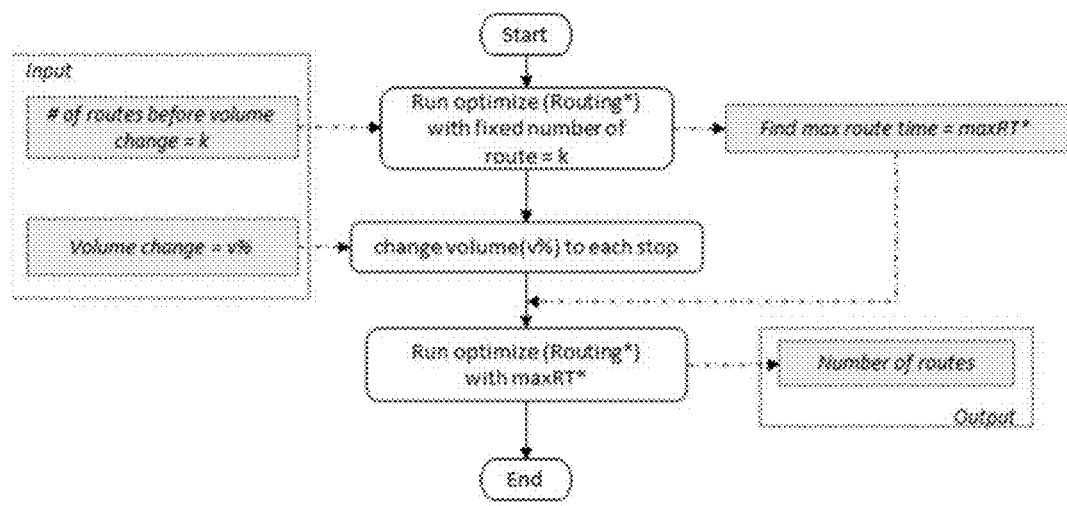
FIG. 4 is a flow diagram of an illustrative method according to embodiments of the present disclosure.
Figure 5:
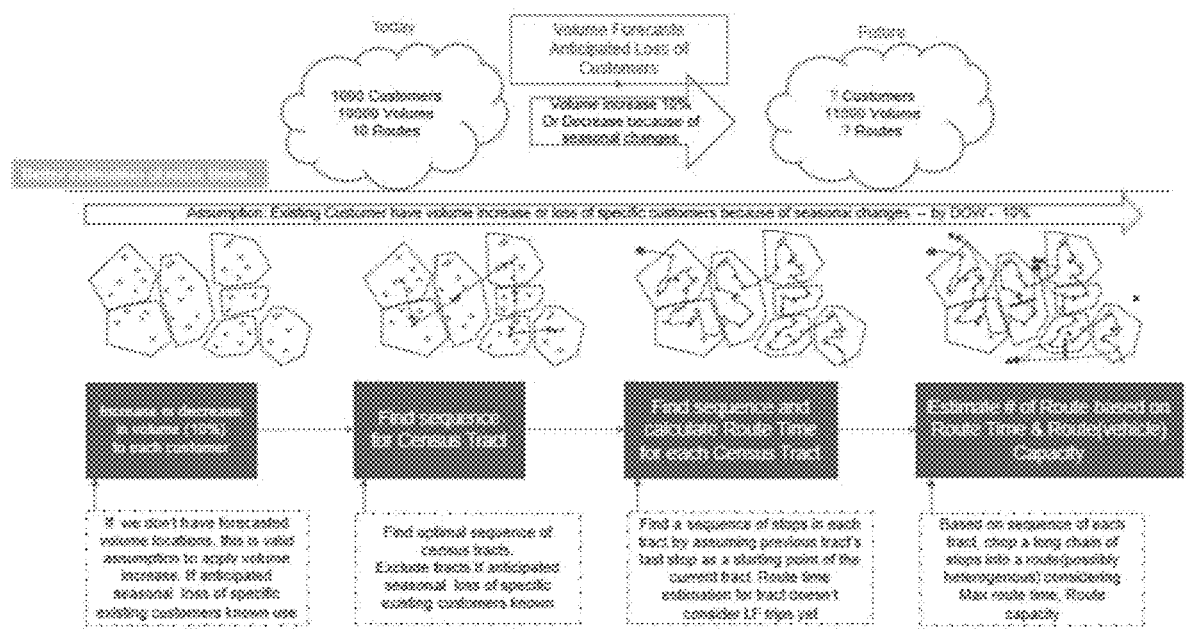
FIG. 5 is a flow diagram of an illustrative method according to embodiments of the present disclosure.

Referring now to FIGS. 4-5, illustrative embodiments of a system and method for using geographic entities for future route estimation are also provided. Traditional means for estimating future routes are often based on historical data regarding the number of routes used in relation to the forecasted volume of waste in a specific operational or geographic area. This typical approach has a number of disadvantages. For example, it does not accurately estimate volume increase/decrease at the customer level. Also, it cannot project the impact of volume increase to route times, especially correlations of landfill break points for a route because of volume changes to estimate the route times.

In certain illustrative embodiments, the presently disclosed system and method can estimate the number of future routes based on future customer footprint or anticipated demand, which can lead to more effective operational planning. This approach can be applicable to multiple use cases, including loss or gain of customers because of seasonal volume changes as well as economic conditions resulting in loss or gain of customers, to inform the anticipated number of future routes. In addition, estimating the number of future routes can also anticipate future driver and/or vehicle needs to meet operational requirements.

In certain illustrative embodiments, the following steps can be utilized as an alternative to, or in addition to, using historical volume vs. number of routes. As shown in FIG. 5, for a volume increase of "v %" and a current number of routes of "k", the route optimization described herein can be run initially with current volume and current number of routes, to determine the current route time maximum. Next, for every customer, volume v % can be increased and the route optimization can be re-run with the route time maximum. The result of this step is the estimated number of routes. In certain illustrative embodiments, performance of route number estimation from future anticipated demand can include: (i) increase or decrease in volume (x %) to each customer (if you don't have forecasted volume locations, this is valid assumption to apply volume increase; if anticipated seasonal loss of specific customers known use); (ii) find sequence for census tract (find optimal sequence of census tracts; exclude tracts if anticipate seasonal loss of specific existing customers is known); (iii) find sequence and calculate route time for each census tract (find a sequence of stops in each tract by assuming previous tract's last stop as a starting point of the current tract; route time estimation for tract does not consider LF trips yet); and (iv) estimate number of routes based on route time and route/vehicle capacity based on sequence of each tract, chop a long train of stops into a route, possibly heterogeneous, considering max route time, route capacity). This is based on assumption that existing customers have volume increase or loss of specific customers because of seasonal changes by DOW, of 10%, in certain illustrative embodiments.

The presently disclosed system and method have a number of advantages. The estimation of routes is very accurate, since it considers landfill ("LF") break points along with volume changes because of increase or decrease of customers. Also, when volume estimation is known for certain geographic units, such as tracts, changes can be added only in this area to impact the route change. This allows for what-if analysis to model and estimate the number of routes based on the future customer demand.

The presently disclosed system and method can be especially effective for creation and maintenance of optimal and practical waste collection routes that meet operational realities (such as crossing highways, navigating physical boundaries, etc.) and enabling tactical planning. The number of routes in a given geographical area can be optimized to realize operational efficiencies and add new customers and/or services while still meeting existing customer commitments. Operational planning can be improved, with users having the ability to estimate the number of future routes based on future customer footprint or demand. Seasonal volume changes can be considered, and customers can be put on hold to inform future routes. Future demand from customers can be incorporated in a geographical area to enable the planning of waste collection routes. Estimating the number of future routes enables users to estimate future driver and vehicle needs to meet operational requirements.

FIGS. 2-3 and FIGS. 4-5 herein illustrate exemplary methods with a plurality of sequential, non-sequential, or sequence independent "steps" as described herein. It should be noted that the methods of FIGS. 2-3 and FIGS. 4-5 are exemplary and may be performed in different orders and/or sequences as dictated or described herein, and any alternative embodiments thereof. Numerous arrangements of the various "steps" can be utilized. In addition, not all "steps" described herein need be utilized in all embodiments. However, it should be noted that certain particular arrangements of "steps" for the methods described herein are materially distinguishable from and provide distinct advantages over previously known technologies.

The presently disclosed system and method can be incorporated into the functional operations of the service vehicles, to communicate and provide routing, optimization and other operational information to vehicle drivers and workers regarding waste/recycling collection and delivery routes. This can occur prior to beginning operations and/or on an ongoing, real time basis. As a result, the disclosed subject matter has a variety of practical applications, as well as provides solutions to a number of technological and business problems of the prior art.

Service vehicles used in the waste collection, delivery, disposal and recycling industry often have on-board computers, location devices and interior and exterior safety and non-safety related cameras installed on the exterior and interior thereof. These devices can provide waste services providers and their field managers with information related to the service vehicle, location of the service vehicle, service confirmation, customer service issues, service routing issues, customer site information and safety issues and concerns, as well as provide vehicle drivers and workers with information relating to collection and delivery routes.

Figure 6:
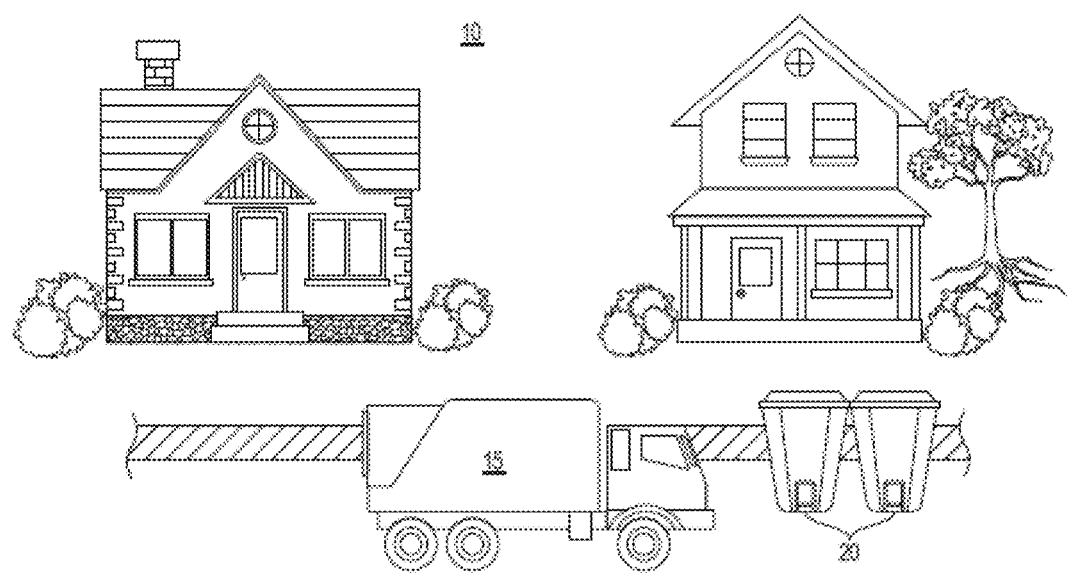
FIG. 6 is a representative example of a waste services environment to be serviced by a waste service vehicle according to embodiments of the present disclosure.

For example, FIG. 6 is an example of a services environment 10 where the presently disclosed system and method can be utilized. A service vehicle 15 is configured to provide services to customers, which can include typical lines of waste industry services such as waste collection and transport and/or recycling for commercial, residential and/or industrial. Service vehicle 15 collects waste or recyclables from a plurality of containers 20 which will typically be assigned to, or associated with, specific customers registered to a waste collection company.

Figure 7:
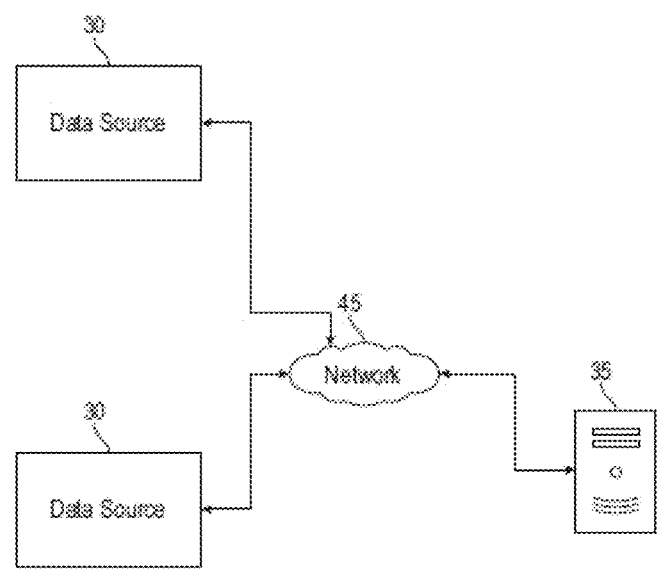
FIG. 7 is a system for data collection and sharing for a waste services provider during performance of a waste service activity in the environment of FIG. 1, according to embodiments of the present disclosure.

FIG. 7 illustrates a high-level overview of a system and network according to various illustrative embodiments herein. The components and general architecture of the system and network may be adapted for use in the specific services environment of FIG. 6. The system can include one or more data sources 30 and a central server 35. Data sources 30 may be, for example, devices configured for capturing and communicating operational data indicative of one or more operational characteristics. Data sources 30 are configured to communicate with central server 35 by sending and receiving operational data over a network 45 (e.g., the Internet, an Intranet, or other suitable network). Central server 35 may be configured to process and evaluate operational data received from data sources 30 in accordance with user input received via a user interface provided on a local or remote computer.

Figure 8:
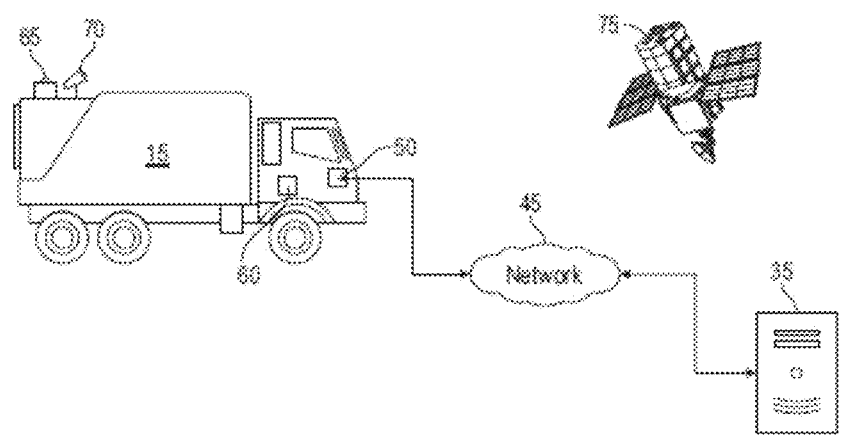
FIG. 8 an example of a communications network for a waste services vehicle according to embodiments of the present disclosure.
Figure 9:
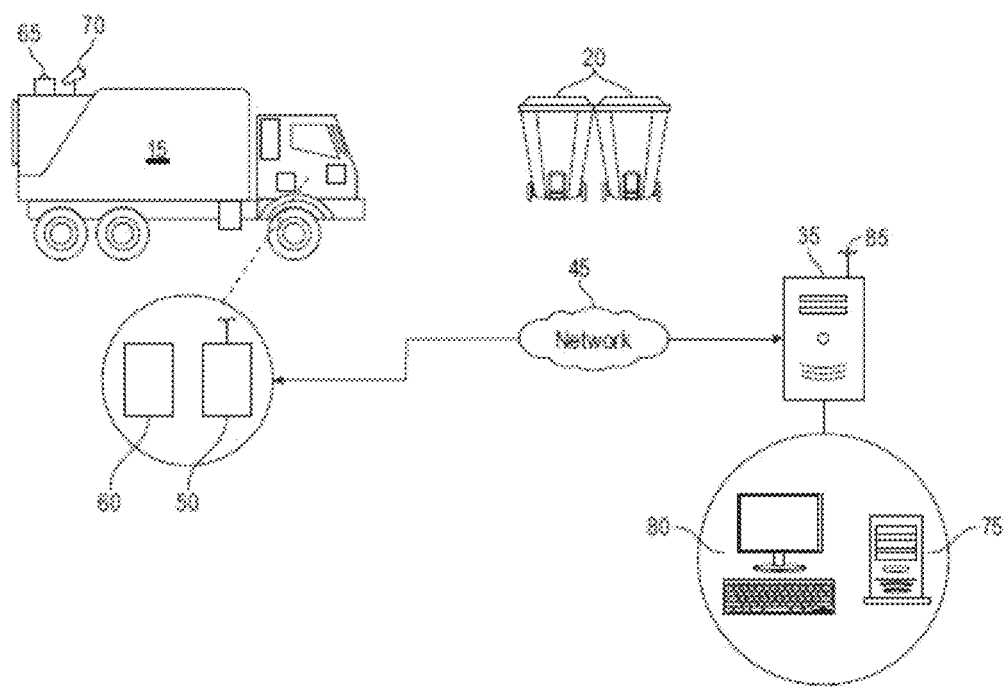
FIG. 9 is an example of a communications network for a waste services vehicle according to embodiments of the present disclosure.
Figure 10:
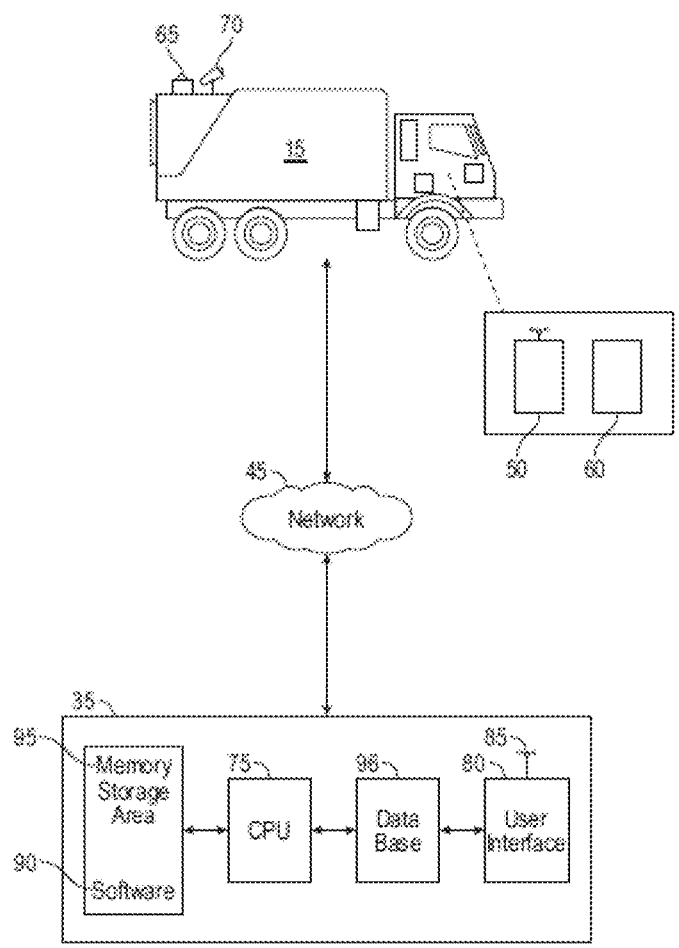
FIG. 10 is an example of a computing system according to embodiments of the present disclosure.

In the illustrative embodiment shown in FIGS. 8-10, a system and network are provided wherein a communications device 50 can be disposed on waste service vehicle 15. Communications device 50 and central server 35 are configured to communicate with each other via a communications network 45 (e.g., the Internet, an Intranet, a cellular network, or other suitable network). In addition, communications device 50 and central server 35 are configured for storing data to an accessible central server database 96 located on, or remotely from, central server 35. In the description provided herein, the system may be configured for managing and evaluating the operation of a large fleet of service vehicles 15. As such, in certain illustrative embodiments, the system may further comprise a plurality of communications devices 50, each being associated with one of a plurality of waste service vehicles 15.

In certain illustrative embodiments, the communication between communications device 50 provided on-board service vehicle 15 and central server 35 may be provided on a real time basis such that during the collection/delivery route, data is transmitted between each service vehicle 15 and central server 35. Alternatively, communication device 50 may be configured to temporarily store or cache data during the route and transfer the data to the central server 35 on return of service vehicle 15 to the location of the collection/delivery company.

In certain illustrative embodiments, as illustrated in FIG. 8, service vehicle 15 can also include an onboard computer 60 and a location device 65. Onboard computer 60 can be, for example, a standard desktop or laptop personal computer ("PC"), or a computing apparatus that is physically integrated with vehicle 15, and can include and/or utilize various standard interfaces that can be used to communicate with location device 65 and optical sensor 70. Onboard computer 60 can also communicate with central server 35 via a communications network 45 via communication device 50. In certain illustrative embodiments, service vehicle 15 can also include one or more optical sensors 70 such as video cameras and relating processors for gathering image and other data at or near the customer site.

Location device 65 can be configured to determine the location of service vehicle 15 always while service vehicle 15 is inactive, in motion and operating and performing service related and nonservice related activities. For example, location device 65 can be a GPS device that can communicate with the collection/delivery company. A satellite 75 or other communications device can be utilized to facilitate communications. For example, location device 65 can transmit location information, such as digital latitude and longitude, to onboard computer 60 via satellite 75. Thus, location device 65 can identify the location of service vehicle 15, and therefore the location of the customer site where container 20 is located, after vehicle 15 has arrived at the customer site.

In the illustrative embodiment of FIGS. 9-10, an exemplary computer system and associated communication network is shown. In certain illustrative embodiments, central server 35 can be configured to receive and store operational data (e.g., data received from waste services vehicle 15) and evaluate the data to aid waste services company in improving operational efficiency. Central server 35 can include various means for performing one or more functions in accordance with embodiments of the present invention, including those more particularly shown and described herein; however, central server 35 may include alternative devices for performing one or more like functions without departing from the spirit and scope of the present invention.

In certain illustrative embodiments, central server 35 can include standard components such as processor 75 and user interface 80 for inputting and displaying data, such as a keyboard and mouse or a touch screen, associated with a standard laptop or desktop computer. Central server 35 also includes a communication device 85 for wireless communication with onboard computer 60.

Central server 35 may include software 90 that communicates with one or more memory storage areas 95. Memory storage areas 95 can be, for example, multiple data repositories which stores pre-recorded data pertaining to a plurality of customer accounts. Such information may include customer location, route data, items expected to be removed from the customer site, and/or billing data. For example, using the location (e.g., street address, city, state, and zip code) of a customer site, software 90 may find the corresponding customer account in memory storage areas 95. Database 96 for data storage can be in memory storage area 95 and/or supplementary external storage devices as are well known in the art.

While a "central server" is described herein, a person of ordinary skill in the art will recognize that embodiments of the present invention are not limited to a client-server architecture and that the server need not be centralized or limited to a single server, or similar network entity or mainframe computer system. Rather, the server and computing system described herein may refer to any combination of devices or entities adapted to perform the computing and networking functions, operations, and/or processes described herein without departing from the spirit and scope of embodiments of the present invention.

In certain illustrative embodiments, a system is provided for optimizing waste/recycling collection and delivery routes for waste/recycling service vehicles. Central server 35 may utilize memory storage area 95 and processor 75 in communication with memory storage area 95, and/or onboard computer 60 can be utilized, to perform the method steps described herein and communicate results to/from the vehicle, prior to and/or in real time during performance of the waste/recycling service activity. Also, in certain illustrative embodiments, software can execute the flow of the method steps of FIGS. 2-3 and FIGS. 4-5 herein while interacting with the various system elements of FIGS. 6-10.

In certain illustrative embodiments, the presently disclosed systems and methods can also be utilized in connection with a centralized platform for remote, real-time customer management of waste/recycling pick-up and collection services. In certain illustrative embodiments, a system for facilitating selection and monitoring of waste/recycling pick-up and collection services by a customer can include a memory, an electronic viewing portal with a display for viewing by a customer, and a processor coupled to the memory programmed with executable instructions. The processor and/or memory can be configured to receive identifying information from a customer via the electronic viewing portal, associate the customer with stored customer information based on the identifying information, determine (using back end functionality) one or more waste/recycling pick-up and collection service options for the customer based on the stored customer information, which can include the use of customer and/or container discovery information based on GPS drive path analysis for a waste/recycling service vehicle as described in the various embodiments herein, display the one or more waste/recycling pick-up and collection service options on the display, receive instructions from the customer regarding which of the waste/recycling pick-up and collection service options to perform, and display the status of the performance of the one or more waste/recycling pick-up and collection service options on the electronic viewing portal for viewing by the customer. The customer facing applications may be present in the form of downloadable applications installable and executable on user devices, e.g., "electronic viewing portals" such as computers, smartphones, or tablets. Additionally (or alternatively), the customer applications may be available as one or more web applications, accessible via a client device having an internet browser. The customer facing applications can utilize customer service digitalization and allow a customer to select and/or monitor waste/recycling pick-up and collection services from the provider on a real-time basis, and the customer offerings can be based, in whole or in part, upon back end functionality that includes the use of customer and/or container discovery information based on GPS drive path analysis for a waste/recycling service vehicle, as described in the various embodiments herein. The presently disclosed systems and methods can also be utilized in connection with a centralized platform for remote, real-time customer management of other services besides waste/recycling pick-up and collection services, such as, for example, package delivery, logistics, transportation, food delivery, ride hailing, couriers, freight transportation, etc.

Those skilled in the art will appreciate that certain portions of the subject matter disclosed herein may be embodied as a method, data processing system, or computer program product. Accordingly, these portions of the subject matter disclosed herein may take the form of an entirely hardware embodiment, an entirely software embodiment, or an embodiment combining software and hardware. Furthermore, portions of the subject matter disclosed herein may be a computer program product on a computer-usable storage medium having computer readable program code on the medium. Any suitable computer readable medium may be utilized including hard disks, CD-ROMs, optical storage devices, or other storage devices. Further, the subject matter described herein may be embodied as systems, methods, devices, or components. Accordingly, embodiments may, for example, take the form of hardware, software or any combination thereof, and/or may exist as part of an overall system architecture within which the software will exist. The present detailed description is, therefore, not intended to be taken in a limiting sense.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C. As used herein, the term "A and/or B" means embodiments having element A alone, element B alone, or elements A and B taken together.

While the disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter.

Additionally, while various embodiments of the disclosed subject matter have been described, it is to be understood that aspects of the disclosed subject matter may include only some of the described embodiments. Accordingly, the disclosed subject matter is not to be seen as limited by the foregoing description, but is only limited by the scope of the claims.

What is claimed is:

1. A method of optimizing delivery of waste or recycling services to customers using a waste or recycling service vehicle, the method comprising:
    developing, via a computing device, a sequence of two or more census tracts containing customer stops using United States census tract data, wherein developing the sequence of two or more census tracts comprises determining a representing customer stop for each census tract, wherein the representing stop comprises a customer location that is at or near the centroid of the census tract and sequencing the census tracts using the representing stops of each census tract to determine an optimal tract sequence list;
    developing, via a computing device, a travel route for the waste or recycling service vehicle using the sequence of two or more census tracts and a plurality of unrouted customer stops associated with the two or more census tracts;
    communicating the travel route to the waste or recycling service vehicle; and
    delivering waste or recycling services to customers along the travel route with the waste or recycling service vehicle,
    wherein the travel route is developed using a primary fullness criteria comprising one or more of a daily volume capacity or a daily maximum time met for the travel route, a secondary fullness criteria comprising one or more of a daily volume capacity or a daily maximum time met for the travel route, and a tertiary fullness criteria comprising one or more of a daily volume capacity or a daily maximum time met for the travel route.

2. The method of claim 1, wherein the tertiary fullness criteria can vary depending on the type of waste or recycling service vehicle.

3. The method of claim 1, wherein the primary fullness criteria further comprises real time route conditions, including but not limited to traffic conditions on the road, and wherein the position of the vehicle on the road through a GPS device can be applied to perform a real time reroute.

4. A system for optimizing delivery of waste or recycling services to customers, the system comprising:
a waste or recycling service vehicle;
a memory storage area; and
a processor in communication with the memory storage area and configured to:
develop a sequence of two or more census tracts containing customer stops using United States census tract data, wherein developing the sequence of two or more census tracts comprises determining a representing customer stop for each census tract, wherein the representing stop comprises a customer location that is at or near the centroid of the census tract and sequencing the census tracts using the representing stops of each census tract to determine an optimal tract sequence list,
develop a travel route for the waste or recycling service vehicle using the sequence of two or more census tracts and a plurality of unrouted customer stops associated with the two or more census tracts, and
communicate the travel route to the waste or recycling service vehicle;
wherein the travel route is developed using a primary fullness criteria comprising one or more of a daily volume capacity or a daily maximum time met for the travel route, a secondary fullness criteria comprising one or more of a daily volume capacity or a daily maximum time met for the travel route, and a tertiary fullness criteria comprising one or more of a daily volume capacity or a daily maximum time met for the travel route.

* * * * *